No. 733,799. PATENTED JULY 14, 1903.
E. H. BENEDICT.
WINDMILL.
APPLICATION FILED AUG. 14, 1902.
NO MODEL.
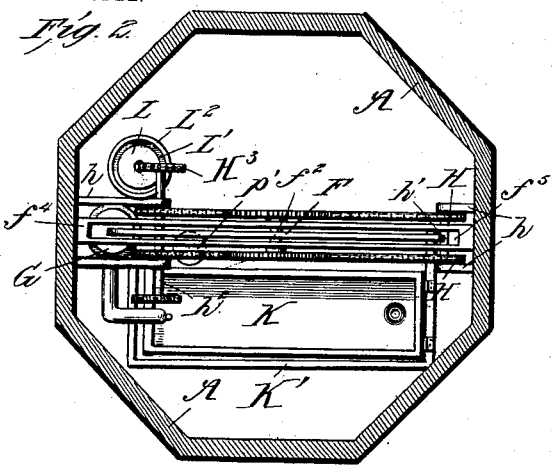
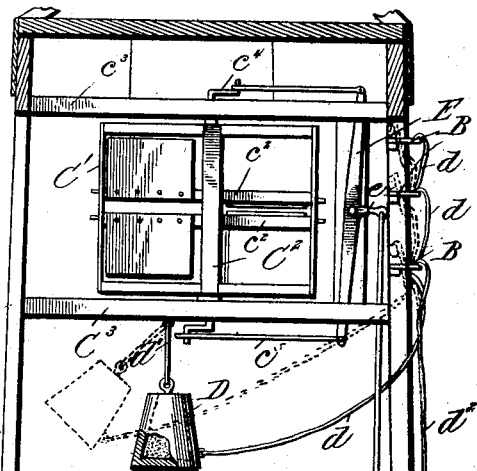
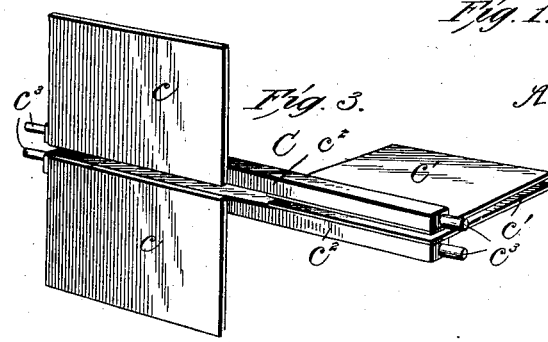
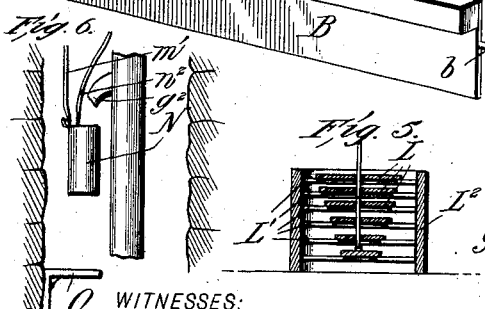
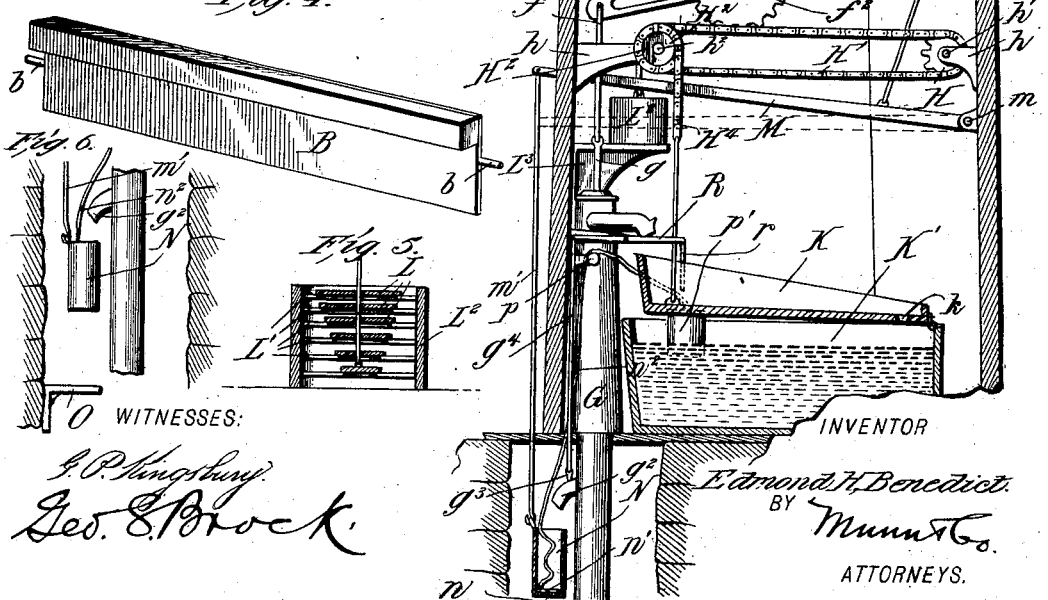
WITNESSES:
G. P. Kingsbury
Geo. S. Brock
INVENTOR
Edmond H. Benedict
BY Munn & Co.
ATTORNEYS.
THE NORRIS PETERS CO., PHOTO-LITHO., WASHINGTON, D. C.

No. 733,799.

Patented July 14, 1903.

UNITED STATES PATENT OFFICE.

EDMOND HUBERT BENEDICT, OF O'NEILL, NEBRASKA.

WINDMILL.

SPECIFICATION forming part of Letters Patent No. 733,799, dated July 14, 1903.

Application filed August 14, 1902. Serial No. 119,622. (No model.)

*To all whom it may concern:*

Be it known that I, EDMOND HUBERT BENEDICT, of O'Neill, in the county of Holt and State of Nebraska, have invented a new and useful Improvement in Windmills, of which the following is a specification.

My invention relates particularly to the construction of a windmill, the means for regulating access of wind to the same, and means for regulating the leverage of the pump driven thereby corresponding to the force of the wind; and it consists of the novel construction, arrangement, and combination of parts, as will be hereinafter fully described, and pointed out in the claims.

In the accompanying drawings, Figure 1 is a central vertical sectional view. Fig. 2 is a transverse section on line $x$ $x$ of Fig. 1. Fig. 3 is a perspective view of the sails or vanes forming part of the windmill proper. Fig. 4 is a perspective view of one of the automatic shutters for regulating access of wind to the wheel proper. Fig. 5 is a vertical section of the weight-box and graduated weights for shifting the fulcrum of the pump-lever. Fig. 6 is a fragmentary view showing the device for regulating the opening and closing of shutters and controlling access of wind to the wheel proper.

The tower or vertical frame of the windmill is represented as octagonal in shape, though any other suitably-shaped tower may be used, and its lower part will be incased by light boarding. The access of the wind to the wheel C is regulated by the shutters B, (see Fig. 4,) which are pivoted in a vertical plane on each side of the frame A. Inasmuch as the shutters, their arrangement, and connections are identical for each side of the frame for the sake of clearness I have illustrated them at one side only, as in Fig. 1. These shutters are pivoted eccentrically or weighted at their inner upper edge and are provided with horizontal pivots $b$, whereby they normally stand open. They are connected with each other and with a swinging weight D by a cord $d$, connected thereto in any suitable manner, said weight being preferably bell-shaped and suspended from the wheel-chamber by a cord $d'$ and is preferably made hollow to lessen its weight, being normally held by the tension of the cord $d$ in a substantially vertical position.

The wheel proper, C, consists of a suitable frame $C'$, mounted upon a vertical crank-shaft $C^2$, having its bearings in parallel cross-bars $C^3$ of the tower A. It is provided with a series of pairs of vanes $c$ and $c'$, (see Fig. 3,) which are attached to rotatable shafts $c^2$ $c^2$, which are provided with pivots $c^3$ $c^3$ and are arranged horizontally in the frame $C'$ of the wheel—that is to say, a vane or sail $c$ is secured to a shaft $c^2$ on one end thereof, and a similar vane $c'$ is attached to the other end of the same shaft, but at right angles to the first-mentioned vane $c$. The two shafts $c^2$ are arranged parallel and close together, as shown in Fig. 3. The result of this arrangement is that when acted upon by the wind those vanes or sails $c$ which are opposite each other on the adjacent ends of the shafts will assume a similar position—say vertical, as shown—while the other vanes $c'$ will assume a horizontal position and lie parallel. The wheel C is therefore rotated by the force of the wind acting upon that pair of vanes or sails which stand vertical, and whatever the direction of the wind it will always happen that two vanes or sails will stand vertical or open while the others are closed. When the force of the wind exceeds a certain due limit, it will swing the weight D beyond its vertical position and through the cord $d$ automatically close the shutters B, as shown in dotted lines, Fig. 1, and thereby obviously reduce or stop the rotation of the wheel C.

The cranks $c^4$ of the crank-shaft $C^2$ project in opposite directions, as shown in Fig. 1, and are connected by rods $c^5$ with a vertical lever E, which is pivoted centrally and provided at its fulcrum with a short arm $e$, from which a rod $e'$ extends downwardly to a horizontal lever F, pivoted in a lower portion of the tower A. Another rod $f$ is pivotally connected to the opposite end of the lever F and connects at its lower end with the piston-rod $g$ of the pump G. From this arrangement it is apparent that the rotation of the wind-wheel C will oscillate the T-lever E, which will in turn oscillate the horizontal lever F, and thereby operate the pump. The aforesaid lever F is provided with a horizontal slot $f'$, in which is adapted to slide the fulcrum-pin $f^2$, which also slides in horizontal slots or guideways $f^3$, made in a horizontal cross-bar $f^4$, secured in the frame A, as shown in Fig. 1. Said cross-bar $f^4$ is also provided with a vertical slot $f^5$, within which the slotted lever F is adapted to oscillate. The horizontal thickness of lever F is such as to nearly fill the slot $f^5$, so as to prevent lateral movement of said lever, yet leave sufficient space to permit of the free oscillation of the said lever F. Upon the outer ends of the fulcrum-pin $f^2$, which extends through the slot $f'$ of lever F and also through the slots or guideways $f^3$ in cross-bar $f^4$, are secured the toothed wheels F', and located immediately above the said wheels F' and secured to the frame at each end are the rigid bars $F^2$, the lower faces of which are provided with teeth corresponding to the teeth of wheels F' and with which they are always in gear.

Below the slotted cross-bar $f^4$ at a suitable distance therefrom are secured to the frame brackets $h$, in which are mounted the shafts $h'$ and $h^2$, carrying the sprocket-wheels H, suitably spaced apart. Mounted on these sprocket-wheels H are the endless sprocket-chains H', and these chains are so positioned that their upper runs contact and mesh with lower teeth of the sprocket or gear wheels F'. The shaft $h^2$ is extended at each end beyond the sprocket-wheels H thereon, and to the outer ends thereof are secured the sprocket-wheels $H^2$ $H^3$. Secured at one end to the sprocket $H^2$ and meshing with and adapted to wind thereon is a sprocket-chain $H^4$, the lower end of which is connected to one end of the pivoted trough K. To the sprocket-wheel $H^3$ is secured and adapted to wind thereon the sprocket-chain $H^5$; but said chain winds in an opposite direction to chain $H^4$. The lower end of said chain $H^5$ passes through a series of graduated weights L, being secured to the lowermost one. Said weights are adapted to normally rest on shelves L', provided with graduated openings $e$, said shelves being secured in a case $L^2$, which is secured upon a bracket $L^3$, secured within the frame A. The trough K is pivoted at its lower front end to the stationary tank K' and is provided at said lower front end with a small cone-shaped outlet or opening $k$, the purposes of which will be later described.

Secured to the lowermost of shutters B, which, as stated, are coupled together by the cord $d$, is the cord or rope $d^2$, which extends downwardly and is secured at its lower end to the lever M, which is pivoted at one end to the frame A by a suitable pivot $m$. Said cord $d^2$ is secured to the lever M between its ends at a suitable distance from its fulcrum, and the other end of the said lever has pivotally secured to it a rod $m'$, the lower end of which is secured to a bucket N, adapted to hang within the pump-well. Said bucket is provided with an opening $n$ in its bottom and a flap-valve $n'$ for respectively covering and uncovering said opening at suitable periods. Located in the pump-well at a suitable point is a bracket or shelf O, which limits the downward movement of the bracket. Secured to the flap-valve $n'$ is a cord $n^2$, which extends upwardly and passes over pulley $p$, suitably mounted, and thence to a float $p'$ in the tank K'.

The pump G has in the lower part of its barrel a small spout $g^2$, controlled by a valve $g^3$, and said spout is located adjacent to the bucket N, into which it is designed to discharge water from the pump at the proper time. Extending upwardly from said valve is a rod $g^4$, the upper end of which is connected to the end of lever R, pivoted at or about its center, the other end of said lever being provided with a downward extension $r$, which is adapted to be moved vertically by the float $p'$, located in the lower tank K', when it rises to its highest position.

The operation of the device is as follows: The various parts are shown in their normal position. Now should the wind exceed the prescribed limit the wheel will rotate faster than the normal rate of speed and cause the pump, through T-lever E and intermediate connections, to discharge water into the pivoted trough K more rapidly than it can be discharged through the small cone-shaped opening $k$ in the front end near the pivot. Such being the case, the trough K is rapidly filled, and the weight of the water therein causes the rear end to descend and carry with it the sprocket-chain $H^4$, which turns sprocket-wheel $H^2$ to the right and drives the sprocket-chains H' also to the right. These chains meshing with the lower teeth of sprockets F', the upper teeth of the same being in engagement with the rigid racks, cause the said sprockets F' to move to the right, and as these sprockets carry the fulcrum $f^2$ of the lever F with them and as said fulcrum slides in the slots or guideways $f^3$ in the cross-bar $f^4$ as well as in the slot $f'$ of the lever F it will be seen that the fulcrum is shifted or moved to the right and the stroke of the pump-piston lengthened and the leverage of the power-driven end of F shortened. The trough K when it has descended to the lowermost position and discharged its contents is brought back to its normal position by the graduated weights L on the end of the sprocket-chain $H^5$, which normally holds the trough K in its normal position, but the combined weight of which was overcome by preponderance of weight of the water in said trough. It should be noted that the float $p'$ in tank K' when filled with water lifts the free end of lever R and through rod $r$ opens the valve $g^3$ in spout $g^2$, allowing water to flow into bucket N, the flap-valve $n'$ being closed by the water when the bucket becomes filled, its weight (when so filled) being such that it descends and carries rod $m'$ with it and through lever M and cord $d^2$ closes the shutters B, thus cutting off the access of wind to the wheel V. The bucket N descends only as far as the bracket in the pump-well and rests thereon until the descent of the float $p'$ again, which is connected by intermediate mechanism to the flap-valve $n'$, opens the same, and allows the water contained in said bucket to discharge, whereupon the superior weight of the shutters B causes them to open and through the cord $d^2$ and connections will lift the bucket and restore it to its normal position, the other parts of the device also resuming their former position and operation. When the shutters have been closed by the mechanism described, the tank K' is filled and the windmill remains at rest until the water in said tank K' has been used or at least fallen low enough to set in motion the intermediate connections between float $p'$ and valve $n'$ in the bucket N to open said valve, whereupon, as stated, the shutters will open again and the windmill resume its operation. When the wind is very strong, it will act directly on the bell-shaped weight D and forcing it beyond its vertical position and carrying with it the cord $d$, which is connected at its other end to the lowermost shutter B, through traction on the said cord $d$ close the shutters and quickly reduce or stop the rotation of the wheel C, and said weight D being hollow may have a quantity of sand or other suitable substance within it to regulate its weight according to the force of the wind in various places. When the trough K has been carried down at one end by the weight of water therein caused by too-rapid working of the pump, it will at a certain point discharge its contents, and then the graduated weights L', which form a cumulative counterpoise overcoming the weight of the tank, carry the tank back to its normal position, and at the same time the other mechanisms are performing their office to shift the fulcrum of lever F to the left. It will thus be seen that I provide means whereby the leverage of the pump is regulated correspondingly to the force of the wind. When the fulcrum of lever F is at the center of the horizontal slotted guideways $f^3$, the stroke of the pump-rod $f$ and the driver-rod $f'$ will be equal. Now when the fulcrum is moved to the left, the stroke of the driver-rod $f'$ remaining the same or constant, the stroke of the piston-rod $f$ will be shorter, but with an increased leverage, and the same results will be attained as if a small pump were used. When the fulcrum is moved to the right, the stroke of the driver remaining the same, the stroke of the piston-rod is increased, giving the results of a large pump with a long stroke. The normal position of the fulcrum of lever F for low winds is to the left of the center of the horizontal slotted guideways $g^3$ and the pivoted trough K will be in its normal position, as shown in full lines in Fig. 1. The cone-shaped opening $k$ is of such size that when the pump is discharging water at its normal rate the water will freely discharge into tank K' and not cause the said pivoted trough to descend; but as soon as the discharge of the pump is raised above the normal the water will gorge in said opening $k$ and cause the trough K to fill and descend, working on the pivot at its front end. The purpose of the shifting fulcrum is to utilize both high and low winds, using a large pump with a long stroke, thus running the pump with a long stroke and short leverage in high winds and a short stroke and long leverage in low winds.

Having thus described my invention, what I claim as new, and desire to secure by Letters Patent, is—

1. In a windmill, the combination with a wheel proper mounted in a tower, a series of pivoted and weighted shutters standing normally open in a horizontal position, a swinging weight suspended from said tower, means for connecting the swinging weight and said shutters, whereby when the force of the wind exceeds a due limit and forces the weight from its normal position, the shutters will be partly closed or wholly closed.

2. In a windmill, the wheel proper comprising a rotating frame, a series of pairs of parallel rotatable shafts the members of each pair arranged in close proximity to each other, and mounted in said frame, each shaft of each pair provided with a vane at each end, the vane at one end secured to and projecting therefrom at a right angle to the vane secured to and projecting from its opposite end, said shafts being mounted in the frame at their outer ends only.

3. In a windmill the combination with a horizontally-revolving wheel mounted in a tower or frame and having a central crank-shaft, a vertically-oscillating bell-crank lever, connections between said horizontally-revolving wheel and the bell-crank lever, a slotted horizontal lever mounted in the lower part of said frame, a rod connecting one end of said slotted lever with the bell-crank lever, and another rod connecting the opposite end of the slotted lever with the piston-rod of a pump, a fulcrum adapted to slide and rotate within the slotted lever, and means for sliding and rotating said fulcrum.

4. In a windmill, the combination with the wheel proper, a double-crank shaft on which said wheel is mounted, a bell-crank lever mounted in the tower, connections between the ends of the bell-crank lever and the cranks, a rod connected at one end to the bell-crank and at its opposite end to one end of slotted lever, a fulcrum for said slotted lever, a slotted cross-bar in which said fulcrum is mounted, a rod connecting the opposite end of the slotted lever with the piston-rod of a pump or other device to be operated, rack-bars located above said slotted cross-bar, pinions secured to the end of the fulcrum, and adapted to mesh with said rack-bars, sprocket-wheels mounted on suitable shafts in the tower below said slotted cross-bar, endless sprocket-chains mounted on said sprocket-wheels and adapted to engage the lower teeth of the pinions on the fulcrum, sprocket-wheels secured to the ends of one of the shafts on which the sprocket-chains rotate, cords or chains secured to and wound upon the sprockets on the outer end of said shaft, said cords or chains being wound in opposite directions, a series of graduated weights secured to the free end of one cord or chain, a pivoted trough secured at one end to the free end of the other cord or chain, whereby the endless sprocket-chains will be moved in one direction by the descent of the pivoted trough when full of water, and shift the fulcrum to lengthen the stroke of the slotted lever, and be shifted back again to its normal position by the graduated weights, when the pivoted trough has become emptied.

5. In a windmill, the combination with a wheel proper mounted in a tower, weighted shutters pivoted in the sides of the tower for controlling the access of wind to the wheel, a lever pivoted at one end in the lower part of the tower, connections between the shutters, and the lever, a pump in the lower part of the tower, a pivoted trough adapted to receive the discharge from the pump, a tank below said trough, a spout or outlet in lower part of the pump-barrel, a valve or stop-cock in said spout, a rod connected to the end of the lever which is connected with the shutters, a bucket having a perforated bottom and suspended from said rod in the pump-well, a flap-valve in the perforated bottom of said bucket, a cord or chain connected at one end to said flap-valve, and passing over a pulley, a float in the tank and connected to the other end of the cord or chain, a short lever pivoted adjacent to the pump and provided at one end with a downward extension adapted to be engaged by the said float, a rod connected at its upper end to said short lever and at its lower end to the valve or stop-cock in the lower portion of the pump-barrel, and a bracket or shelf upon which said bucket is adapted to rest when filled, whereby when said pivoted trough is filled and descends, the fulcrum of the slotted lever is shifted and the weighted shutters will be closed, and access of wind to the wheel proper be shut off.

6. A windmill, comprising a wheel proper provided with a double-crank shaft upon which it is mounted, a bell-crank lever mounted in the tower, connections between the ends of the bell-crank lever and the cranks, a rod connected at one end to the bell-crank and at its opposite end to one end of a slotted lever, a shifting fulcrum for said slotted lever, a slotted cross-bar in which said fulcrum is mounted, a rod connecting the opposite end of the slotted lever with the piston-rod, of a pump to be operated, rack-bars located above said slotted cross-bar, pinions secured to the end of the fulcrum and adapted to mesh with said rack-bars, sprocket-wheels mounted on suitable shafts in the tower below said slotted cross-bar, endless sprocket-chains mounted on said sprocket-wheels and adapted to engage the lower teeth of the pinions on the fulcrum, sprocket-wheels secured to the ends of one of the shafts on which the sprocket-chains rotate, cords or chains secured to and wound upon the sprockets on the outer ends of said shaft, said cords or chains being wound in opposite directions, a series of graduated weights forming a cumulative counterpoise secured to the free end of one cord or chain, a pivoted trough secured at one end to the free end of the other cord or chain, a tank below said pivoted trough, weighted shutters pivoted in the sides of the tower adjacent to the wheel proper, a horizontal lever pivoted at one end in the lower part of the tower, a pump located in the lower part of the tower, a spout or outlet in the lower part of the pump-barrel, a valve or stop-cock in said spout, a rod connected to the end of the lever which is connected with the shutters, a bucket having a perforated bottom and suspended from said rod in the pump-well, a flap-valve in the perforated bottom of said bucket, a cord or chain connected at one end to said flap-valve passing over a pulley, a float in the tank and connected to the other end of the cord or chain, a short lever pivoted adjacent to the pump and provided at one end with a downward extension adapted to be engaged by the said float, a rod connected at its upper end to said short lever and at its lower end to the valve or stop-cock in the lower portion of the pump-barrel, and a bracket or shelf upon which said bucket is adapted to rest when filled, whereby when said pivoted trough is filled and descends the fulcrum of the slotted lever is shifted, and whereby the weighted shutters will be closed and prevent access of wind to the wheel proper.

7. In a windmill, the wheel proper comprising a rotating frame a central axis supporting the same, a series of parallel rotatable shafts arranged close together, and provided with gudgeons at their ends adapted to bear in the central shaft and the outer members of the rotating frame, and vanes or sails attached at the ends of each shaft, the vanes at ends of each shaft projecting at right angles to each other.

EDMOND HUBERT BENEDICT.

Witnesses:
EQQUISKI,
J. J. KING.